(12) United States Patent
Azmoon

(10) Patent No.: US 9,684,882 B2
(45) Date of Patent: Jun. 20, 2017

(54) PERMITTED ASSIGNMENT USER INTERFACE

(71) Applicant: ServiceNow, Inc., Santa Clara, CA (US)

(72) Inventor: Troy Azmoon, Carlsbad, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 14/984,186

(22) Filed: Dec. 30, 2015

(65) Prior Publication Data

US 2016/0189077 A1 Jun. 30, 2016

Related U.S. Application Data

(60) Provisional application No. 62/098,503, filed on Dec. 31, 2014, provisional application No. 62/098,456, filed on Dec. 31, 2014.

(51) Int. Cl.
| | |
|---|---|
| *G06Q 10/00* | (2012.01) |
| *G06Q 10/06* | (2012.01) |
| *G06Q 10/10* | (2012.01) |
| *G06T 11/20* | (2006.01) |

(52) U.S. Cl.
CPC ....... *G06Q 10/06316* (2013.01); *G06Q 10/06* (2013.01); *G06Q 10/06311* (2013.01); *G06Q 10/103* (2013.01); *G06Q 10/109* (2013.01); *G06T 11/206* (2013.01)

(58) Field of Classification Search
USPC ........................................ 705/7.26; 715/781
See application file for complete search history.

(56) References Cited

U.S. PATENT DOCUMENTS

| | | |
|---|---|---|
| 6,970,844 B1 | 11/2005 | Bierenbaum |
| 7,010,753 B2 | 3/2006 | Windl et al. |
| 7,774,220 B2 | 8/2010 | Sullivan et al. |

(Continued)

OTHER PUBLICATIONS http://leankit.com/product-tour, "Stay informed with instant visibility into your team's work and process." Downloaded Dec. 17, 2014. Web site contains videos.*

(Continued)

*Primary Examiner* — Stephanie Delich
(74) *Attorney, Agent, or Firm* — Fletcher Yoder PC

(57) ABSTRACT

Systems, apparatuses, and methods for displaying a visual task board comprising a permitted assignment user interface are disclosed. Displaying a permitted assignment user interface may comprise generating a first card representing a first record, wherein the first record comprises an information element that has a first value of a visualization metric, generating an output for display, the output comprising a first lane representing the first value of the visualization metric and comprising the first card, and, in response to operator input indicating a primary context and on a condition that an association between the primary context and the first record is prohibited, updating the output by generating an updated first card representing the first record and indicating that the association between the first record and the primary context is prohibited, and generating an updated output for display omitting the first card and comprising the updated first card.

20 Claims, 13 Drawing Sheets

(56) References Cited

U.S. PATENT DOCUMENTS

| | | | | |
|---|---|---|---|---|
| 8,060,466 | B1* | 11/2011 | Round | G06F 17/30893 707/609 |
| 8,170,901 | B2 | 5/2012 | Shukla et al. | |
| 8,606,611 | B1* | 12/2013 | Fedorov | G06Q 10/06 705/7.13 |
| 8,683,362 | B2 | 3/2014 | Shiplacoff et al. | |
| 2004/0117046 | A1* | 6/2004 | Colle | G06Q 10/109 700/99 |
| 2008/0033777 | A1 | 2/2008 | Shukoor | |
| 2008/0034314 | A1* | 2/2008 | Louch | G06F 3/0481 715/778 |
| 2008/0301086 | A1* | 12/2008 | Gupta | G06F 17/30592 |
| 2009/0234699 | A1 | 9/2009 | Steinglass et al. | |
| 2012/0035974 | A1 | 2/2012 | Seybold | |
| 2012/0116835 | A1 | 5/2012 | Pope et al. | |
| 2012/0233312 | A1* | 9/2012 | Ramakumar | G06Q 40/12 709/224 |
| 2013/0006688 | A1 | 1/2013 | Knapp | |
| 2013/0007694 | A1 | 1/2013 | Knapp | |
| 2014/0195944 | A1 | 7/2014 | Herger et al. | |
| 2016/0188134 | A1* | 6/2016 | Azmoon | G06T 11/206 715/781 |

OTHER PUBLICATIONS http://www.axosoft.com/quick-start#qsVideo5, Axosoft, "Quick start videos and guides", "Hit the ground running in your Axosoft evaluation with our comprehensive resources". Downloaded Dec. 17, 2014. Web site contains videos.* http://www.versionone.com/home/?utm_expid=653507-26. m1ATd7-AQp21H3jQ_QB_Hg.1&utm_referrer=http%3A%2F%2Fblog.softwareadvice. com%2Farticles%2Fproject-management%2F5-favorite-agile-project-management-jis-0314%2F, VersionOne, "Agile Made Easier, All-in-one agile project management platform for software Drganizations of any size." Downloaded Dec. 17, 2014.* http://www.versionone.com/home/?utm_expid=653507-26. m1ATd7-AQp21H3jQ_QB_Hg.1&utm_referrer=http%3A%2F%2Fwww.google.com%2F, Version One, "Agile Made Easier, All-in-one agile project management platform for software organizations of any size." Downloaded Dec. 17, 2014. Web site contains videos.* http://www.versionone.com/product/agile-visualization/, VersionOne, "Agile Visualization", "See How Everything Fits Together". Downloaded Dec. 17, 2014. Web site contains videos.* http://kanbantool.com/product, Kanban Tool, Online Kanban Boards, Insightful Analytics, Etc. Downloaded Dec. 17, 2014. Web site contains videos.* http://collaboration.about.com/od/projectmanagement/tp/7-Kanban-Board-Tools-For-Project-Collaboration.htm, "7 Kanban Board Tools for Project Collaboration", Variety of lightweight, highly detailed, and easy to use Kanban Boards. Downloaded Dec. 17, 2014.* https://jira.atlassian.com/browse/GHS-3922, JIRA Agile, GHS-3922, "As a user, I would like to configure the cards displayed in the rapid board". Downloaded Dec. 17, 2014.* http://info.leankit.com/getting-started, "Getting Started with LeanKit", "Follow these 5 simple steps to get the most out DfLeanKit". Downloaded Dec. 17, 2014. Web site contains videos.*

* cited by examiner

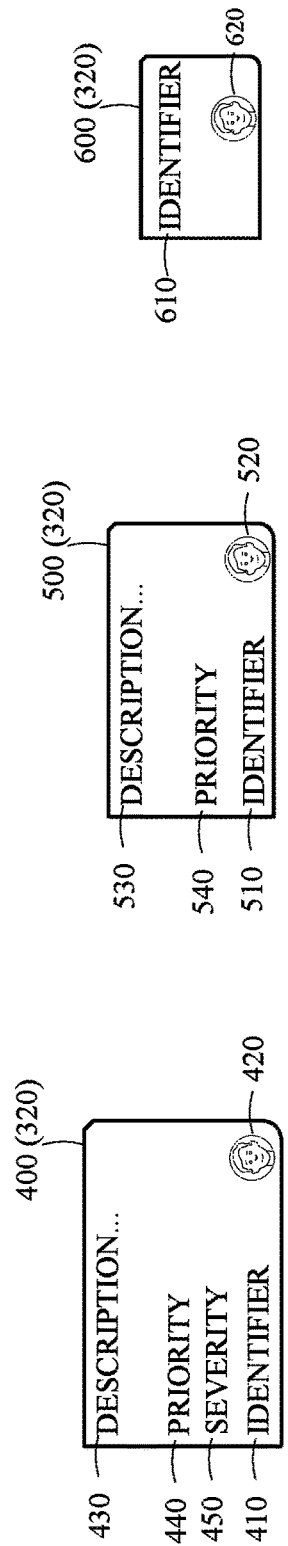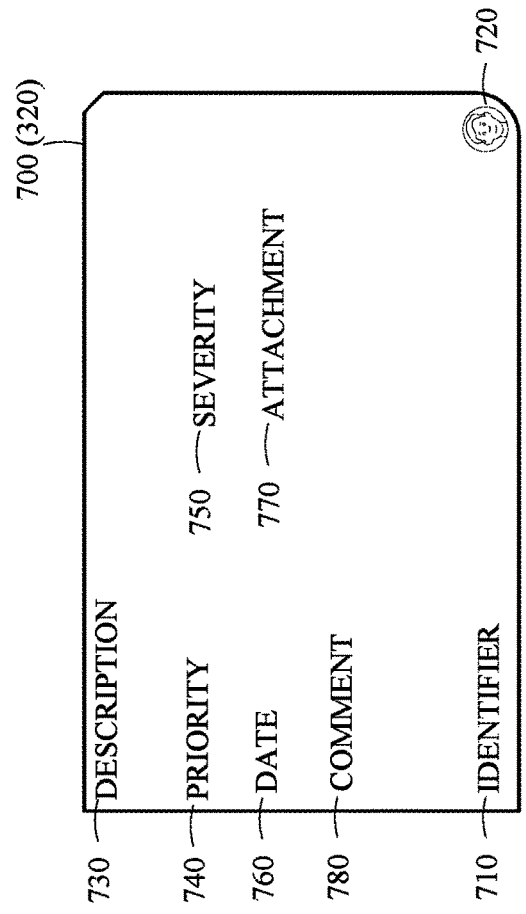

PERMITTED ASSIGNMENT USER INTERFACE

CROSS REFERENCE TO RELATED APPLICATIONS

The present application claims the benefit of U.S. Provisional Application No. 62/098,503, filed Dec. 31, 2014, entitled, "Permitted Assignment User Interface," and U.S. Provisional Application No. 62/098,456, filed Dec. 31, 2014, entitled, "Visual Task Board Visualization", both herein incorporated by reference.

TECHNICAL FIELD

The present disclosure relates in general to techniques and devices for visual task boards and in particular to a graphical interface for visualizing management metrics.

BACKGROUND

Task management, which may include project management, system management, or the like, may require a user to track and analyze significant quantities of interrelated information. Accordingly, a visual task board comprising a permitted assignment user interface would be advantageous.

SUMMARY

One implementation of the disclosure is an apparatus for overlaying an indicator in a window region of a graphical user interface, comprising a processor configured to execute instructions stored in a memory, the instructions comprising an information set identifier module that identifies a visual task board information set structured in the memory that comprises a plurality of records, wherein each record comprises at least one information element from a plurality of information elements from the information set, an information element identifier module that identifies an information element from the plurality of information elements as a visualization metric for output on a display of the graphical user interface, a lane generator module that generates a plurality of lane display regions of a graphical user interface window structured as lanes based on the visualization metric, wherein each lane from the plurality of lanes is associated with a respective value of the visualization metric, a card generator module that generates a card display region of the graphical user interface windows, structured as first card representing a first record from the plurality of records, wherein the first record comprises an information element that has a first value of the visualization metric, an output generation module that generates an output for display in the graphical user interface window, the output comprising a first lane display region from the plurality of lane display regions, the first lane display region representing the first value of the visualization metric and comprising the first card display region that overlaps the lane display region, and an output module that transmits via a graphical user interface output interface or stores in the memory the output, wherein the output generation module, in response to operator input provided to a communication input of the processor indicating a primary context and on a condition that an association between the primary context and the first record is prohibited, is configured to update the output utilizing the card generation module to generate an updated first card display region representing the first record, the updated first card display region comprising an indicator overlay that indicates the association in the memory between the first record and the primary context is prohibited, the lane generation module to generate an updated output for display that comprises an updated first lane display region representing the first value of the visualization metric, the updated first lane display region replacing the first card display region with the updated first card display region, and the output module to transmit via the graphical user interface output interface or stores in the memory the updated output.

Another implementation of the disclosure is an apparatus for overlaying an indicator in a window region of a graphical user interface, comprising a processor configured to execute instructions stored in a memory to identify a visual task board information set that comprises a plurality of records, wherein each record comprises at least one information element from a plurality of information elements from the information set, identify an information element from the plurality of information elements as a visualization metric, generate a plurality of lanes based on the visualization metric, wherein each lane from the plurality of lanes is associated with a respective value of the visualization metric, generate a plurality of cards, wherein each card from the plurality of cards represents a respective record from the plurality of records, and wherein each respective record comprises a respective information element that has a respective value of the visualization metric, generate an output for display, the output comprising each lane from the plurality of lanes, such that each lane from the plurality of lanes represents a respective value of the visualization metric and comprises cards from the plurality of cards that represent records that comprise information elements that have the corresponding value of the visualization metric, transmit or store the output, and in response to operator input indicating a primary context, update the output by generating a plurality of updated cards, wherein each updated card from the plurality of updated cards represents a respective record from the plurality of records, wherein each respective record comprises a respective information element that has a respective value for which an association with the primary context is prohibited, generating an updated output for display, the updated output comprising each updated lane from a plurality of updated lanes, such that each updated lane from the plurality of updated lanes represents a respective value of the visualization metric, wherein each updated lane from the plurality of updated lanes omits cards from the plurality of cards that represent records that comprise information elements that have values for which an association with the primary context is prohibited, and comprises updated cards from the plurality of updated cards, and transmitting or storing the updated output.

Another implementation of the disclosure is a computer-implemented method for overlaying an indicator in a window region of a graphical user interface, comprising identifying, using a processor, a visual task board information set structured in a memory for display on a display device that comprises a plurality of records, wherein each record comprises at least one information element from a plurality of information elements from the information set, and an information element from the plurality of information elements for output on a display of the graphical user interface, creating a plurality of lanes within the visual task board information set memory with each lane being related to an information element, and creating a card for inclusion in a lane of the plurality of lanes that comprises data from a first record of the information element, generating graphical output based on the card and plurality of lanes, transmitting over a graphical user interface output interface or storing in the memory the graphical output, identifying a first user from the plurality of users as a primary context in response to an operator input interacting with a first avatar from the plurality of avatars, wherein the first avatar represents the first user, and on a condition that an association between the first record and the first user is prohibited, update the graphical output by updating the first card indicating that the association between the first record and the first user is prohibited, and updating the first lane representing the first value of the visualization metric, the updated first lane replacing the first card and with the updated first card, and transmitting the updated output over the graphical user interface output interface or storing the updated output in the memory.

BRIEF DESCRIPTION OF THE DRAWINGS

The description herein makes reference to the accompanying drawings wherein like reference numerals refer to like parts throughout the several views.

FIG. 4 is a pictorial diagram of an example of a medium task card in accordance with this disclosure.

FIG. 5 is a pictorial diagram of an example of a small task card in accordance with this disclosure.

FIG. 6 is a pictorial diagram of an example of a minimal task card in accordance with this disclosure.

FIG. 7 is a pictorial diagram of an example of a large task card in accordance with this disclosure.

DETAILED DESCRIPTION

Visual task boards provide a graphical user interface for navigating and managing project and system management information, comprising lists and forms on a display. Records may be represented as cards or card display regions that an operator can view and edit. For example, cards may represent tasks, incidents, problems, conversations, meetings, or the like. Cards may be organized into or overlap/overlay on top of lanes or lane display regions based on metrics, such as status or user. Updates and edits to records may be tracked directly from the visual task board. Visual task boards may be customized to display cards based on user access permissions and privileges. In some embodiments, a visual task board may not efficiently represent permitted assignments.

Described herein is a visual task board comprising a permitted assignment user interface. A permitted assignment user interface may include dynamically updating the visual task board to include a visual indication, or other sensory indication, of prohibited, and permitted, assignments in response to operator input. For example, in response to operator input dragging an avatar representing a user, the permitted assignment user interface may dynamically update the visual task board to change the background on cards to which assignment of the user is prohibited. In response to operator input dragging the avatar to a card to which assignment of the user is prohibited, the permitted assignment user interface may dynamically update the visual task board to indicate other users for which assignment to the card is prohibited, and to indicate users for which assignment to the card is permitted. In another example, in response to operator input dragging a card associated with a user from one lane to another, the permitted assignment user interface may indicate that assignment of the user to the lane is prohibited, and may indicate other users for which assignment to the lane is permitted.

Figure 1:
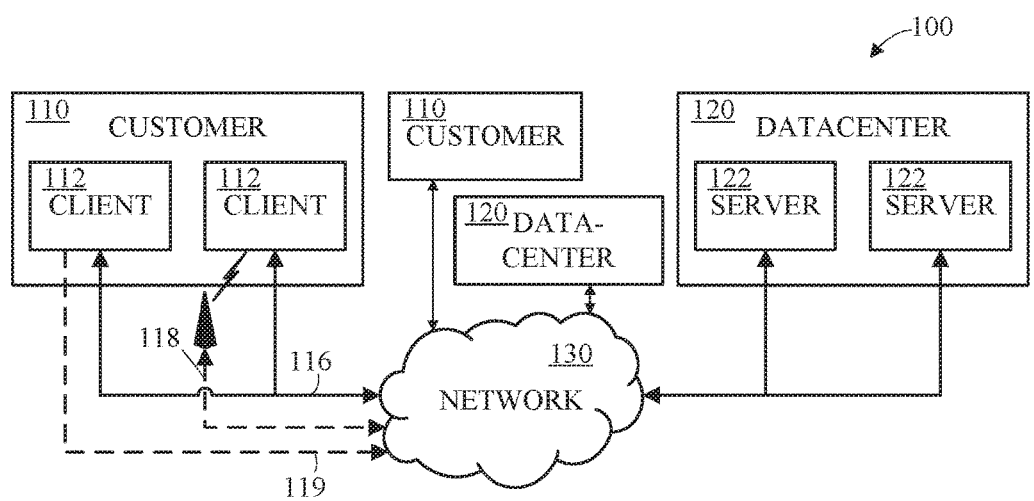
FIG. 1 is a block diagram of a networked distributed or cloud computing system in which the teachings herein may be implemented.

FIG. 1 is a block diagram of a distributed (e.g., client-server, networked, or cloud) computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system comprising multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer and the like. The datacenter 120 and servers 122 are examples only, and a cloud computing system may have a different number of datacenters and servers or may have a different configuration of datacenters and servers. For example, there may be tens of data centers and each data center may have hundreds or any number of servers.

Clients 112 and servers 122 may be configured to connect to network 130. The clients for a particular customer may connect to network 130 via a common connection point 116 or different connection points, e.g., a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

Figure 2:
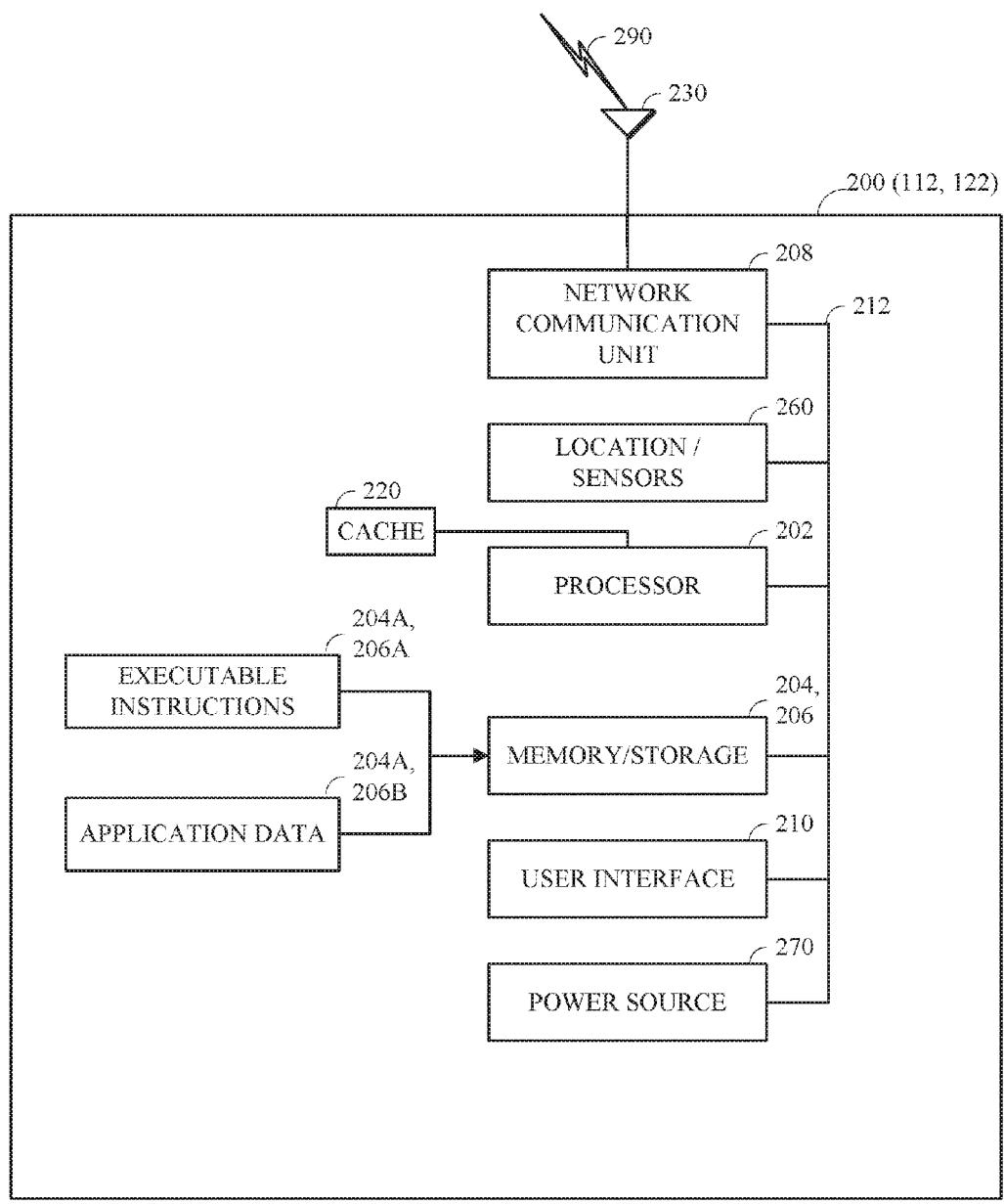
FIG. 2 is a block diagram of an example internal configuration of a computing device, such as a computing device of the computing system as shown in FIG. 1.

FIG. 2 is a block diagram of an example internal configuration of a computing device 200, such as a client 112 or server device 122 of the computing system 100 as shown in FIG. 1, including an infrastructure control server, of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can comprise a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general purpose processor or a special purpose processor.

Random Access Memory (RAM 204) can be any suitable non-permanent storage device that is used as memory. RAM 204 can include executable instructions and data for immediate access by CPU 202. RAM 204 typically includes one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 206 can comprise executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein. The operating system can be, for example, a Microsoft Windows®, Mac OS X®, or Linux®, or operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 comprises instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilized any of a variety of standardized network protocols, such as Ethernet, TCP/IP, to name a few of many protocols, to effect communications between devices. The interface 230 can include one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. Other output devices that permit a user to program or otherwise use the client or server can be provided in addition to or as an alternative to display 210. When the output device is or comprises a display, the display can be implemented in various ways, including by a liquid crystal display (LCD) or a cathode-ray tube (CRT) or light emitting diode (LED) display, such as an OLED display. A structured output of a device can be provided to an input of the display so that the elements provided on the display screen represent the underlying structure of the output data.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

Figure 3:
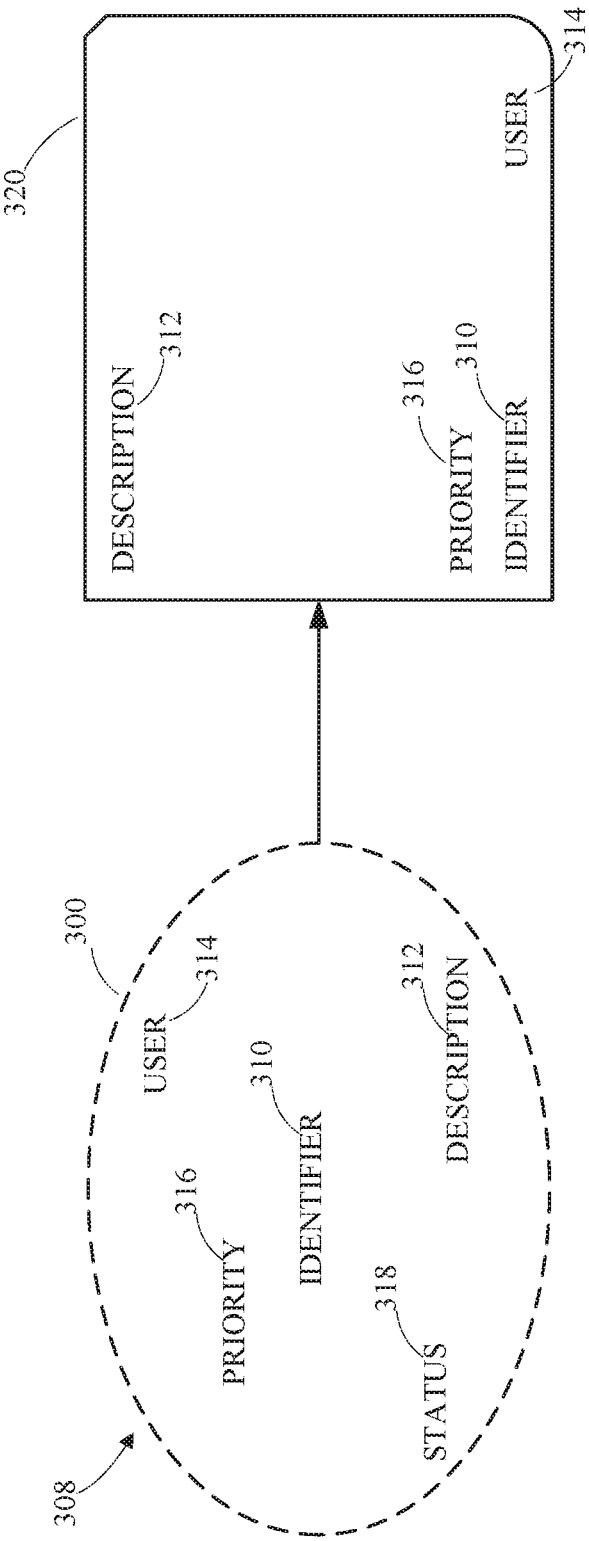
FIG. 3 is a block diagram of an example of representing information in a visual task board in accordance with this disclosure.

FIG. 3 is a block diagram of an example of the type of representing information that may be present within a visual task board 900 (shown in FIG. 9 and described below) in accordance with this disclosure. A visual task board 900 may represent a visualization on a display of an underlying information set. In some applications, the underlying information set represented by a visual task board 900 may fully or partially overlap with an information set represented by another visual task board 900.

Visual task boards 900 may efficiently represent information in an organized structure. For example, a group 300 of related information elements 310, 312, 314, 316, 318, (generically information elements 308), also referred to herein as an information set 300, which may correspond with a record, may be represented in a visual task board 900 as a card 320. A card may represent a discrete grouping of related information, such as information regarding an individual task, an issue, a problem, an event, a conversation, a meeting, or the like. A card 320 may include information, such as comments, attachments, labels, assigned users, status, priority, severity, or a combination thereof, which may be added, removed, or modified in response to user input. In some applications, a card 320 may include a subgrouping of discrete information elements 308. For example, a card may include one or more comments related to a common criterion, such as an incident or a task, and each comment may include multiple discrete information elements, such as a comment text, a date, a time, a commenter identifier, or a combination thereof. In some applications, one or more information elements 308, from a group 300 of related information elements may be omitted from a card. For example, the card 320 shown in FIG. 3 omits the status information element 318.

An information set identifier module may be used to identify a visual task board information set structured in the memory that comprises a plurality of records, each record comprising at least one information element from a plurality of information elements from the information set. An information element identifier module may be used to identify an information element from the plurality of information elements as a visualization metric for output on a display of the graphical user interface.

In a visual task board 900, the amount of information, the type of information, the organization of information, or a combination thereof, included in a card 320 may be automatically adjusted based on the size of the card 320 (and 400, 500, 600, and 700 shown in FIGS. 4-7), and generating a visual task board 900 may include performing scaled visualization, which may include determining the information elements 308 to include in each card 320 based on the size of the card, the number of information elements in the group of data represented by the cards, and the space required for displaying each information element. In some applications, each information element 308 may be associated with a display rank, which may indicate a priority for including the information element 308 in a card 320, and generating a visual task board 900 may include determining the information elements 308 to include in each card 320 based on the size of the card, the number of information elements in the group of data represented by the cards, the space required for displaying each information element, and the display rank for each information element. For example, each information element may have a unique display rank, such as 1, 2, 3, 4, or the information elements may have categorical display ranks, such as high, medium, and low.

FIGS. 4-7 are pictorial diagrams showing examples of cards (FIG. 3, card 320, FIGS. 4-7, cards 400, 500, 600, 700) representing a task that includes various information elements 308, including a task identifier information element, which has a display rank of 1, a user identifier information element, which has a display rank of 2, a description information element, which has a display rank of 3, a task priority information element, which has a display rank of 4, a task severity information element, which has a display rank of 5, a creation date information element, which has a display rank of 6, an attachment information element, which has a display rank of 7, and a comments information element, which has a display rank of 8. Although four sizes of cards 400, 500, 600, 700 are shown for simplicity and by way of example only, any card size may be used. A particular size of the card to use may be either user-selected or system determined, based on the element size, display rank, and other factors described herein. The cards may be generated by a card generator module that generates a card display region of the graphical user interface.

FIG. 4 is a pictorial diagram of an example of a medium task card 400 in accordance with this disclosure. Generating the medium task card 400 may include determining whether to include each information element 308, 410-450 for the task in the card 400 based on the available space in the card and the respective display rank for each information element 308. For example, generating the medium task card 400 may include determining that the task identifier information element 410 has the highest display rank among the information elements 308 for the task, determining that there is space available for the task identifier information element 410 in the card 400, and including the task identifier information element 410 in the card 400. Similarly, generating the medium task card 400 may include determining that the user identifier information element 420 has the second highest display rank among the information elements 308 for the task, determining that there is space available for the user identifier information element 420 in the card 400, and including the user identifier information element 420 in the card 400. Similarly, generating the medium task card 400 may include determining that the description information element 430 has the third highest display rank among the information elements 308 for the task, determining that space is available for the description information element 430 in the card 400, and including the description information element 430 in the card 400. Similarly, generating the medium task card 400 may include determining that the task priority information element 440 has the fourth highest display rank among the information elements 308 for the task, determining that space is available for the task priority information element 440 in the card 400, and including the task priority information element 430 in the card 400. Similarly, generating the medium task card 400 may include determining that the task severity information element 450 has the fifth highest display rank among the information elements 308 for the task, determining that space is available for the task severity information element 450 in the card 400, and including the task severity information element 450 in the card 400. Generating the medium task card 400 may include determining that there is not enough space available in the card 400 to include the creation date information element, the attachment information element, and the comments information element in the card 400, and omitting the creation date, the attachment, and the comments from the card 400.

FIG. 5 is a pictorial diagram of an example of a small task card 500 in accordance with this disclosure. A small card 500 may be similar to a medium card, such as the medium card 400 shown in FIG. 4, except that a small card 500 may be horizontally smaller, vertically smaller, or both, and a small card 500 may omit one or more of the information elements 410-450 included in a medium card 400, may omit a portion of one or more information elements (not shown), or may omit one or more information elements 410-450 and one or more portions of information elements. For example, a small card 500 may omit severity information 450 included in a medium card. In another example, a portion of the description may be truncated. Generating the small task card 500 may include determining that there is space available in the card 500 to include the task identifier 510, the associated user identifier 520, the description 530, and the priority 540, including the task identifier 510, the associated user identifier 520, the description 530, and the priority 540 in the card 500, determining that there is not enough space available to include the severity, the creation date, the attachment, and the comments in the card 500, and omitting the severity, the creation date, the attachment, and the comments from the card 500 based on the display ranking of the information elements.

FIG. 6 is a pictorial diagram of an example of a minimal task card 600 in accordance with this disclosure. A minimal card 600 may be similar to a small card, such as the small card 500 shown in FIG. 5, except that a minimal card 600 may be horizontally smaller, vertically smaller, or both, and a minimal card 600 may omit one or more of the information elements 510-540 included in a small card 500, may omit a portion of one or more information elements (not shown), or may omit one or more information elements 510-540 and one or more portions of information elements. For example, a minimal card 600 may omit the description 530 and the priority 540 information included in a small card 500. Generating the minimal task card 600 may include determining that there is space available in the card 600 to include the task identifier 610 and the associated user identifier 620, including the task identifier 610 and the associated user identifier 620 in the card 600, determining that there is not enough space available to include the description, the priority, the severity, the creation date, the attachment, and the comments in the card 600, and omitting the description, the priority, the severity, the creation date, the attachment, and the comments from the card 600.

FIG. 7 is a pictorial diagram of an example of a large task card 700 in accordance with this disclosure. A large card 700 may be similar to a medium card, such as the medium card 400 shown in FIG. 4, except that a large card 700 may be horizontally larger, vertically larger, or both, and a large card 700 may include one or more information elements 308 omitted from a medium card 400, may include a portion of one or more information elements omitted from a medium card (not shown), or may include one or more information elements 308 omitted from a medium card and a portion of one or more information elements omitted from a medium card. Generating the large task card 700 may include determining that there is space available in the card 700 to include the task identifier 710, the associated user identifier 720, the description 730, the priority 740, the severity 750, a creation date 760, an attachment 770, and comments 780.

In some applications, generating a card may include determining a layout for including information elements in the card. For example, generating a large task card, such as the large task card 700 shown in FIG. 7, may include determining that the card includes enough space to include the task severity 750 to the right of the task priority 740, and generating a medium task card, such as the medium task card 400 shown in FIG. 4, may include determining that the card does not include enough space to include the task severity 450 to the right of the task priority 440.

Figure 8:
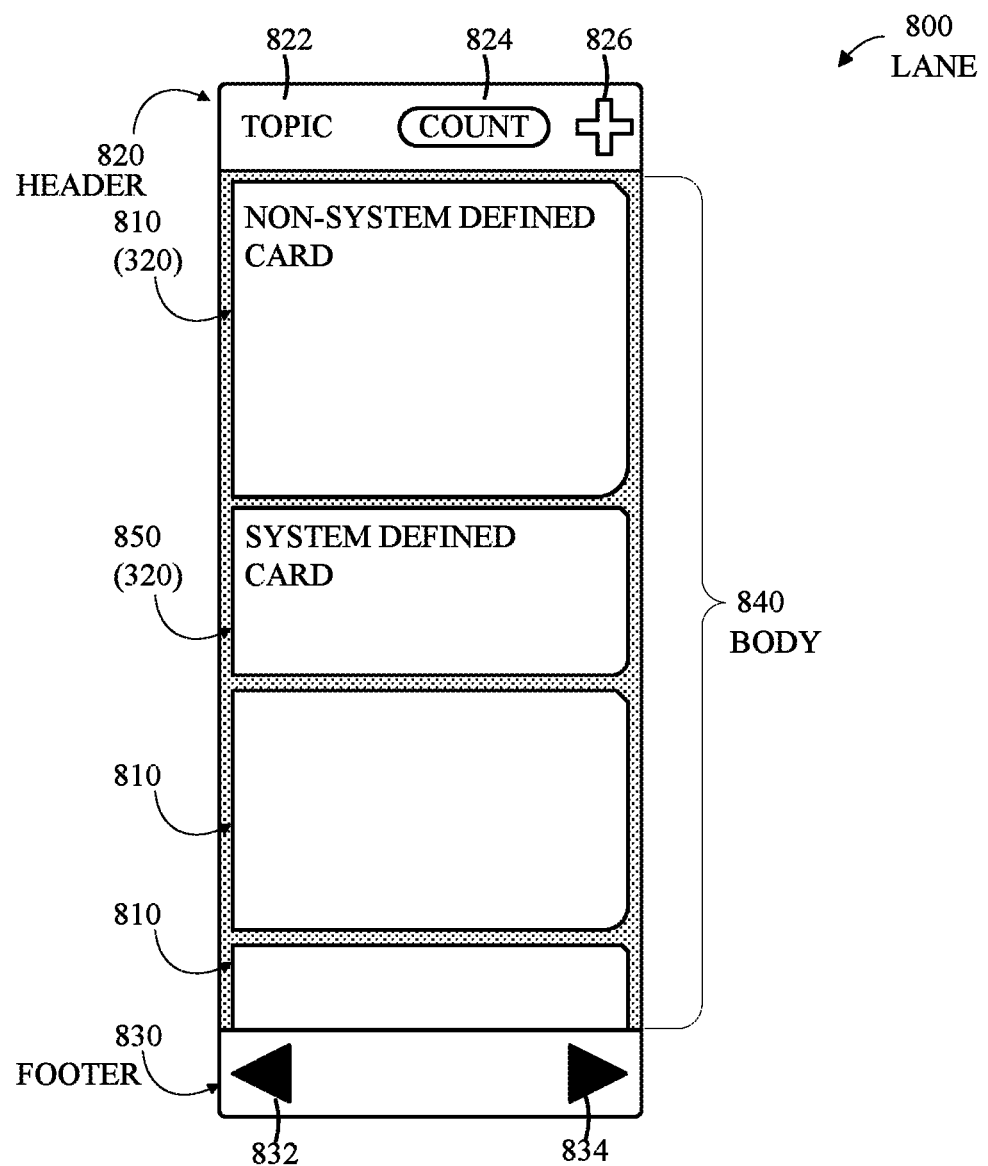
FIG. 8 is a pictorial diagram of an example of a lane in accordance with this disclosure.

FIG. 8 is a pictorial diagram of an example of a lane 800 in accordance with this disclosure. A lane may be generated by a lane generator module that generates a plurality of lane display regions of a graphical user interface. In a visual task board 900, a group of related cards 810, 850 (which are cards 320 from FIG. 3), such as the card 400 shown in FIG. 4, the card 500 shown in FIG. 5, the card 600 shown in FIG. 6, the card 700 shown in FIG. 7, or a combination thereof, may be represented as a lane 800. A lane 800 may organize cards 810, 850 into a vertical group. A lane 800 may represent a defined criterion, such as a subject, which may correspond to a logical grouping of cards, such as a task status or user identifier. For example, a lane may represent a task status, such as "To Do", "Doing", or "Done". In some applications, in a visual task board 900, such as a guided board, each lane may represent a possible field value. For example, a visual task board for an "Incident" table can include a lane for each State value, such as "New", "Active", or "Resolved".

As shown in FIG. 8, a lane 800 may include a lane header 820, a lane footer 830, a lane body 840, or a combination thereof. The lane header 820 may include information, controls, or both. For example, a lane header 820 may include an indication of the subject 822 for the lane 800; a number, count, or cardinality, of records 824 in the lane; or a new record control 826, to add a new record to the lane 800. A lane footer 830 may include, for example, one or more controls to organize the lane relative to other lanes, such as a move left control 832, a move right control 834, or both. The lane body 840 may include zero or more non-system defined cards 810. These cards 810 may be related to a common criterion, which may correspond with the lane type. For example, each card in a "To Do" type lane may have the status "To Do". In some applications, a lane 800 may include a system defined card 850. A system defined card 850 may include information, controls, or both, that are related to the lane independent of the information represented by the other non-system defined cards 810 in the lane. For example, a system defined card 850 may include a control to add a card to the lane, or may include a description of the information represented by the lane.

Figure 9:
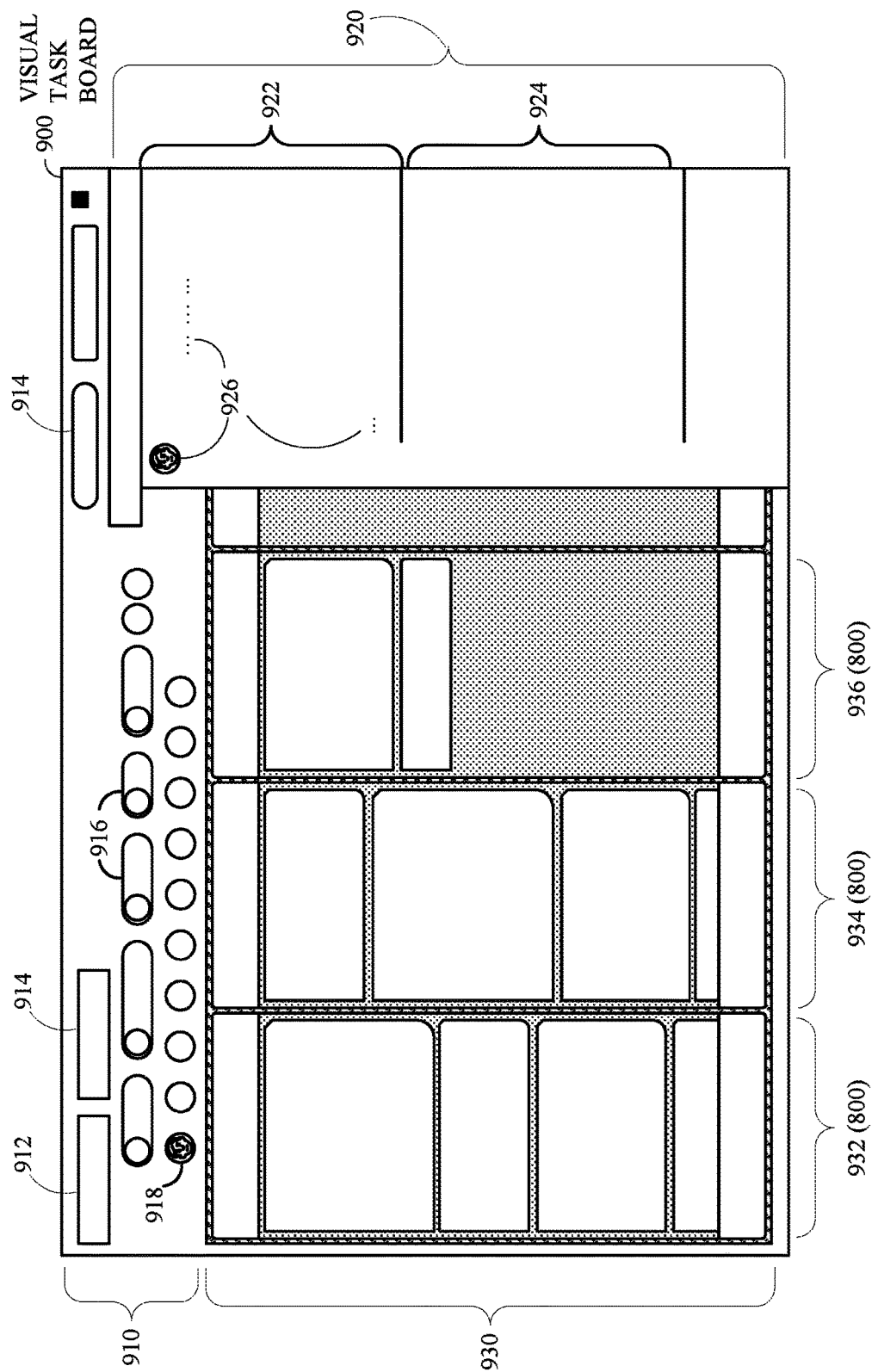
FIG. 9 is a pictorial diagram of an example of a visual task board in accordance with this disclosure.

FIG. 9 is a pictorial diagram of an example of a visual task board 900 in accordance with this disclosure. A visual task board 900 may include a visualization representing a defined underlying information set 300, such as a set of problems reported for a system or a set of tasks for a project. In some implementations, a visual task board 900 may be implemented in a computing system, such as the cloud computing system 100 shown in FIG. 1. For example, the visual task board 900 may be implemented on a server, such as one or more of the servers 122 shown in FIG. 1, and may be accessed by a computing device, such as a client 112 shown in FIG. 1, via a network, such as the network 150 shown in FIG. 1. The implementation may be done by a combination of hardware and software components, wherein the software components may be program modules or algorithms containing a sequence of program instructions that execute on processors of the clients, servers, and other computing devices. The respective program modules or algorithms are discussed in more detail herein.

The visual task board 900 may include a dashboard portion 910, an activity stream portion 920, a task board portion 930, or a combination thereof, as shown. The dashboard 910 may include information and controls for the visual task board 900. For example, the dashboard 910 may include a task board type identifier 912, task board information elements 914, label indicators 916, member indicators 918, or a combination thereof.

A task board type identifier 912 may identify a task board type, such as freeform, flexible, or guided, for the current task board. A freeform type visual task board 900 may include any kind of task record, such as personal tasks. Members of freeform boards 900 may add and remove cards 810 and lanes 800. A flexible task board 900 may include tasks that match a configured filter against a defined table. Members of flexible boards 900 can add cards 810 and define custom lanes 800. In some applications, cards 810 in a flexible task board 900 may be removed automatically when a corresponding task no longer matches the filter conditions for the task board 900. A guided task board 900 may be similar to the flexible task board 900, except that lanes 800 in a guided board 900 may correspond to field values, and editing the lanes 800 may be prevented. In some applications, a task board type identifier 912 may indicate the underlying data set represented by the visual task board 900.

The task board information elements 914 may indicate information about the visual task board 900. For example, a task board information element 914 may indicate a name or description of the task board, such as "Incidents by State." In another example, a task board information element 914 may indicate statistical information about the task board 900, such as a number of lanes, a number of tasks, or both. The labels 916 may include a legend, which may describe aspects of the visual task board 900. For example, the labels 916 may indicate that defects are shown in red or that high priority items are shown in blue. In some applications, the labels 916 may include one or more controls. For example, the labels 916 may include a control for adding a member or user to the information set 300 represented by the visual task board 900. The member identifiers 918 may indicate members, or users, of the information set 300 represented by the visual task board 900.

The activity stream portion 920 may indicate a history of changes to cards 810, and the corresponding records, on the visual task board 900. For example, a first activity stream section 922 may correspond with the most recent change, and a second activity stream section 924 may correspond with a previous change. Each section 922, 924 of the activity stream 920 may include information 926 for the corresponding change, such as an identifier for the change, an indication of a user associated with the change, a date associated with the change, or any other information related to the change. In some applications, the activity stream 920 may be omitted, or partially omitted, from the task board 900.

The task board portion 930 may include lanes 932, 934, 936, such as the lane 800 shown in FIG. 8, which may include cards 810, such as the cards 320, 400, 500, 600, 700 shown in FIGS. 3-7. The visual task board 900 may represent the underlying information set 300 organized based on a defined metric. For example, the underlying information set 300 300 may include records that include information elements 308, and the defined metric may be one of the information elements 308 included in one or more of the records. Each lane 800 may represent a value of the defined metric. Each lane 800 may include cards 810, and each card may represent a record from the underlying information set 300 300.

Although FIG. 9 shows an example configuration for simplicity and clarity, the visual task board 900 is not limited to a particular configuration. For example, the organization and configuration of lanes and cards may be customized in response to user input.

Figure 10:
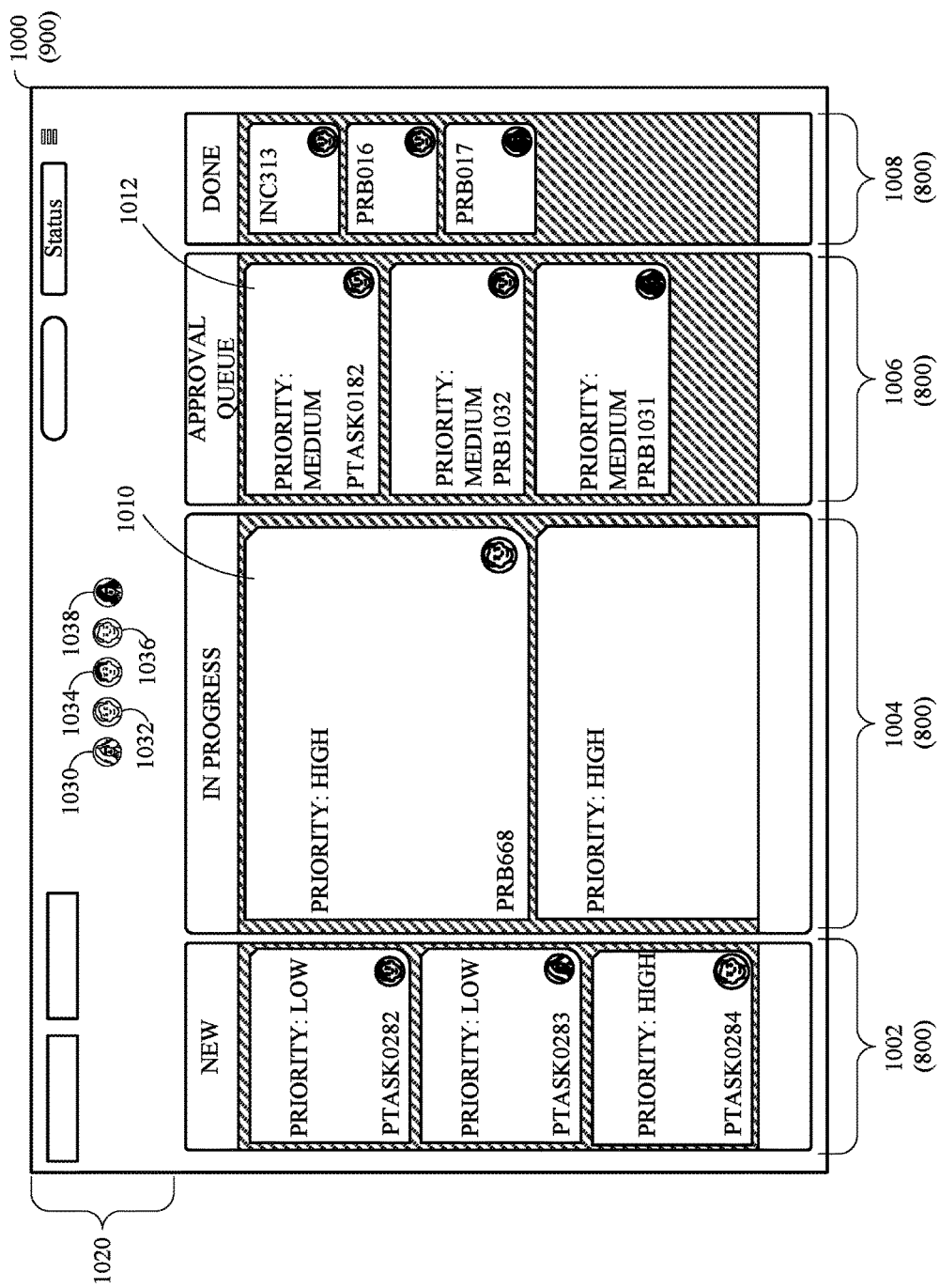
FIG. 10 is a pictorial diagram of an example of a visual task board including assignment in accordance with this disclosure.

FIG. 10 is a pictorial diagram of an example of a visual task board including assignment in accordance with this disclosure. The visual task board 1000 shown in FIG. 10 may represent information for a task management system visualized based on a "status" information element. An output generation module may be provided that generates output for display in the graphical user interface, and an output module may be provided that transmits the output, either via a graphical user interface output interface, or via a memory buffer. As shown, the visual task board 1000 includes four lanes 1002, 1004, 1006, 1008. The first lane 1002 represents records that have the status of "New". The second lane 1004 represents records that have the status of "In Progress". The third lane 1006 represents records that have the status of "Approval Queue". The fourth lane 1008 represents records that have the status of "Done". The second lane 1004 includes a card 1010 that represents a problem with the identifier "PRB668", which has a priority of "High", and a status of "In Progress". The third lane 1006 includes a card 1012 that represents a task with the identifier "PTASK0182", a priority of "Medium", and a status of "Approval Queue". The dashboard portion 1020 of the visual task board 1000 includes five member identifiers, icons, or avatars, 1030, 1032, 1034, 1036, 1038 that represent members, or users, of the information set represented by the visual task board 1000. The member identifiers, icons, or avatars can include any representation of a user and may be different than what is depicted in FIG. 10 depending on the implementation. For example, depending on the implementation, a true avatar (e.g., clip art) image may be used, an actual picture of the user may be used, or a text representation of the user (e.g., the users name) may be used. In certain implementations, the representation can be configurable on a global and/or granular basis such that the system may be capable of representing some or all users using different representations.

A member may be assigned to, or associated with, a record, such as a task or a conversation, using the visual task board 1000. In some embodiments, a member may be assigned to a task in response to input, such as user input indicating an action, such as an assignment or association of a member to a record. For example, a member may be assigned to, or associated with, a record in response to user input dragging an icon 1030, 1032, 1034, 1036, 1038 representing the member, which may be referred to herein as the primary context, and dropping the icon on a card 1010, 1012 representing the task, which may be referred to herein as the secondary context. For example, the icon 1030 on the left may represent a member named Sara, and Sara may be assigned to the problem "PRB668" in response to user input dropping the icon 1030 representing Sara on the card 1010 representing the problem "PRB668".

A record, such as a task record, a problem record, or a conversation record, may be assigned a status using the visual task board 1000. In some embodiments, a record may be assigned a status in response to user input dragging a card 1010, 1012 representing the task to a lane 1002, 1004, 1006, 1008. For example, the card 1012 may be moved from the approval queue lane 1006 to the in progress lane 1004 and the task records represented by the card 1012 may be updated to indicate that the task is in progress.

Figure 11:
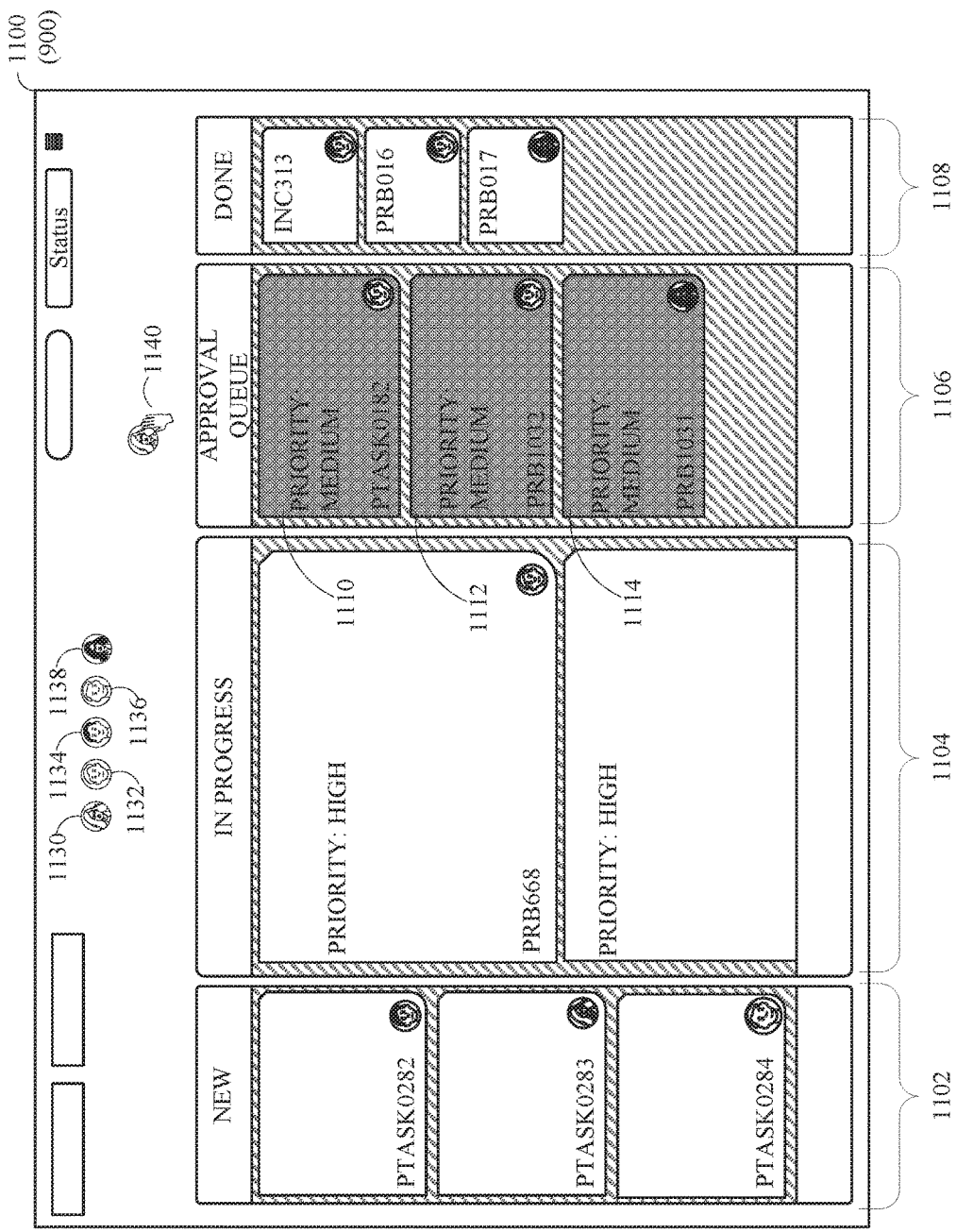
FIG. 11 is a pictorial diagram of an example of a visual task board including primary prohibition indicators in accordance with this disclosure.

FIG. 11 is a pictorial diagram of an example of a visual task board including primary prohibition indicators in accordance with this disclosure. The operation of visual task board 1100 shown in FIG. 11 may be similar to the visual task board 1000 shown in FIG. 10 with the addition or modification of certain features described below.

In some embodiments, the visual task board system may prevent actions, such as the assignment or association of members to records based on one or more information elements. For example, the visual task board system may include information, such as privilege or permission information, for each member indicating whether the member may be assigned to or associated with records that have the Approval Queue status, and the visual task board system may prohibit members from being assigned to or associated with records that have the Approval Queue status based on the permission information. The privilege or permission information may alternatively prohibit members from being assigned to any other lane or card.

A visualization metric is a term used to describe an information item or element from a plurality of such items in an information set, and serves as the displayed representation of an information item or element around which lanes and cards of a visual task board are based. The visualization metric is described in more detail below.

A visual task board may include primary prohibition indicators representing prohibited or invalid assignments or associations of a member. For example, a portion of the visual task board, such as a lane 1102, 1104, 1106, 1108, a card 1110, 1112, 1114, or an avatar 1130, 1132, 1134, 1136, 1138, may include an indication representing a prohibited or invalid assignment user or association based on the primary context. In some embodiments, a visual element, such as a background color, of a prohibited lane 1102, 1104, 1106, 1108, card 1110, 1112, 1114, or avatar 1130, 1132, 1134, 1136, 1138 may indicate an invalid assignment. For example, the background color of a card for a permitted assignment may be white and the background color of a card for a prohibited assignment may be gray. A prohibition indication/indicator may be considered as an overlay in a display region. Such an indication/indicator can include lines, a symbol, color, shape modification. As defined herein, an overlap or overlay is defined to include these as well as any modification to a visual representation upon which it is provided.

In the example shown in FIG. 11, the first avatar 1130 on the left may represent a first member or user, the second avatar 1132 may represent a second member or user, the third avatar 1134 may represent a third member or user, the fourth avatar 1136 may represent a fourth member or user, and the fifth avatar 1138 may represent a fifth member or user. The avatars may be created by an avatar output generation module. The permission information may indicate that each of the five members has permission to be assigned to, or associated with, records that have the New status, the In Progress status, or the Done status. The permission information may indicate that the second member, represented by the second avatar 1132, the third member, represented by the third avatar 1134, and the fifth member, represented by the fifth avatar 1138, have permission to be assigned to or associated with records that have the Approval Queue status. The permission information may indicate that the first member, represented by the first avatar 1130, and the fourth member, represented by the fourth avatar 1136, do not have permission to be assigned to or associated with records that have the Approval Queue status.

In some embodiments, prohibited or invalid assignments or associations may be indicated in response to user input using an association prohibition determination module. For example, a user identification module may be used to identify a first user from the plurality of users as the primary context in response to operator input. The visual task board system may receive information indicating a first selected interface element as the primary context, such as information indicating user input selecting and dragging the first avatar 1130, as shown at 1140. In response to the user input selecting and dragging the first avatar, the visual task board system may indicate that the assignment of the first member to records that have the Approval Queue status is prohibited. In FIG. 11, the cards 1110, 1112, 1114 in the Approval Queue lane 1106 are shown with stippling to indicate that the assignment of the member represented by the selected avatar 1140 is prohibited. In other embodiments, different user input can be used to receive information indicating a first selected interface element as the primary context. For example, the user might click on an avatar 1130 rather than drag it.

Figure 12:
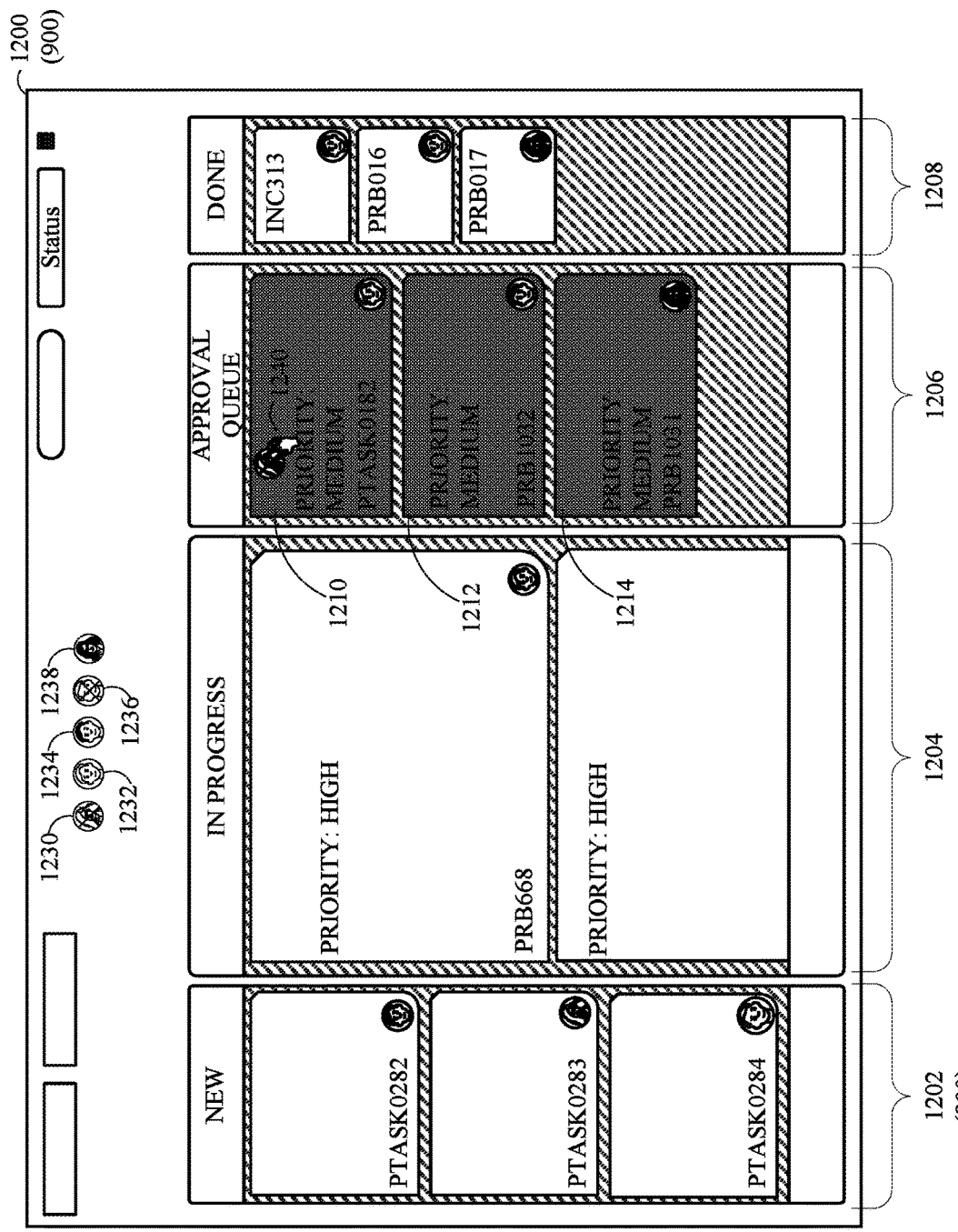
FIG. 12 is a pictorial diagram of an example of a visual task board including secondary prohibition indicators in accordance with this disclosure.

FIG. 12 is a pictorial diagram of an example of a visual task board including secondary prohibition indicators in accordance with this disclosure. The operation of visual task board 1200 shown in FIG. 12 may be similar to the visual task board 1100 shown in FIG. 11 with the addition or modification of certain features described below.

A visual task board 1200 may include a secondary prohibition indicator representing prohibited or invalid assignments or associations of members based on secondary context. For example, portions of the visual task board, such as lanes 1202, 1204, 1206, 1208, cards 1210, 1212, 1214, or avatars 1230, 1232, 1234, 1236, 1238, may include indications representing prohibited or invalid assignments or associations. In some embodiments, visual elements of prohibited lanes, cards, or avatars may indicate invalid assignments. For example, a red X may be shown over avatars 1230, 1236 to indicate that assignment of the members represented by the avatars is prohibited based on a secondary context.

In some embodiments, prohibited or invalid assignments or associations may be indicated in response to input, such as user input, indicating a secondary context. In an example, the visual task board system may receive information indicating user input selecting and dragging the first avatar 1230, which may be identified as the primary context, onto the first card 1210 in the Approval Queue lane, which may be identified as the secondary context, as shown at 1240. In response to the user input selecting and dragging the first avatar 1230 to the first card 1210, the visual task board system may indicate members for which assignment to the first card is prohibited by showing a red X over the corresponding avatars 1230, 1236. The visual task board system may provide this indication in addition to indicating that the assignment of the first member to records that have the Approval Queue status is prohibited. In some embodiments the indication of other members for which assignment is prohibited may be dependent on the secondary context indicating a prohibition (e.g., that the first avatar 1230 may not be assigned to the card or lane over which it has been dragged). For example, where there is not a prohibition, no indication will be provided as to other users. Alternatively, the indication as to other users may be provided regardless of whether there is a detected prohibition, such as described below with respect to FIG. 13. In other embodiments, different user input can be used to receive information indicating a secondary context. For example, the user might click on a card, lane, or member already associated with a card. As another example, the click might be accompanied by a modifier key (e.g., Shift key) being pressed on a keyboard.

Figure 13:
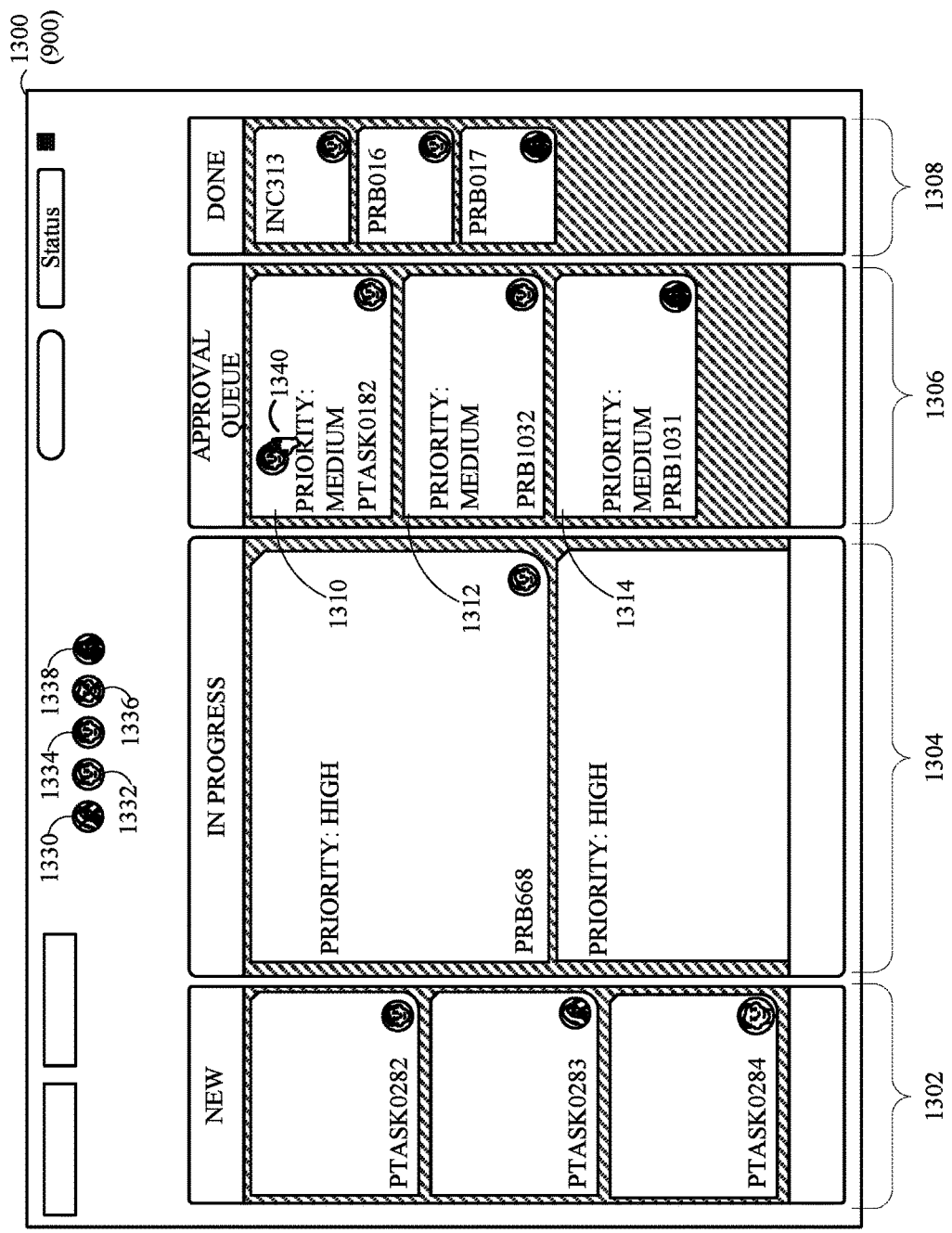
FIG. 13 is a pictorial diagram of another example of a visual task board including secondary prohibition indicators in accordance with this disclosure.

FIG. 13 is a pictorial diagram of another example of a visual task board including secondary prohibition indicators in accordance with this disclosure. The operation of visual task board 1300 shown in FIG. 13 may be similar to the visual task board 1200 shown in FIG. 12 with the addition or modification of certain features described below. The visual task board system may receive information indicating input, such as user input selecting and dragging the third avatar 1334, which may be identified as the primary context, to onto the first card 1310, which may be identified as the secondary context, in the Approval Queue lane. Assignment of the member represented by the third avatar 1334 to records having the Approval Queue status may be permitted, primary prohibition indicators may be omitted, and the visual task board may include a secondary prohibition indicator representing prohibited or invalid assignments or associations of the first member and the fourth member for the first card 1310. For example, a red X may be shown over the first avatar 1330 and the fourth avatar 1336, to indicate that assignment of the corresponding members is prohibited based on a current context.

Figure 14:
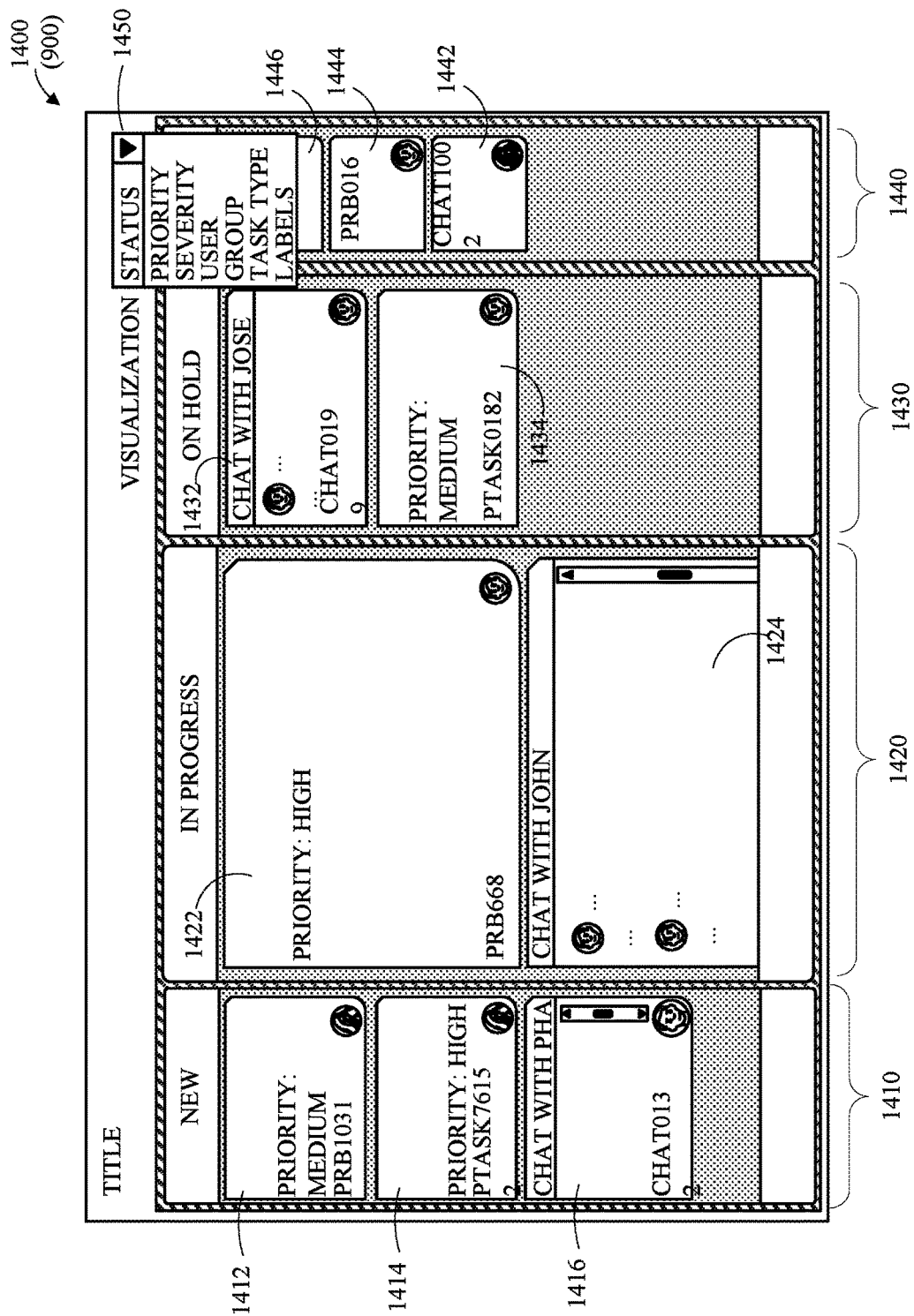
FIG. 14 is a pictorial diagram of an example of a status visualization of a visual task board in accordance with this disclosure.
Figure 15:
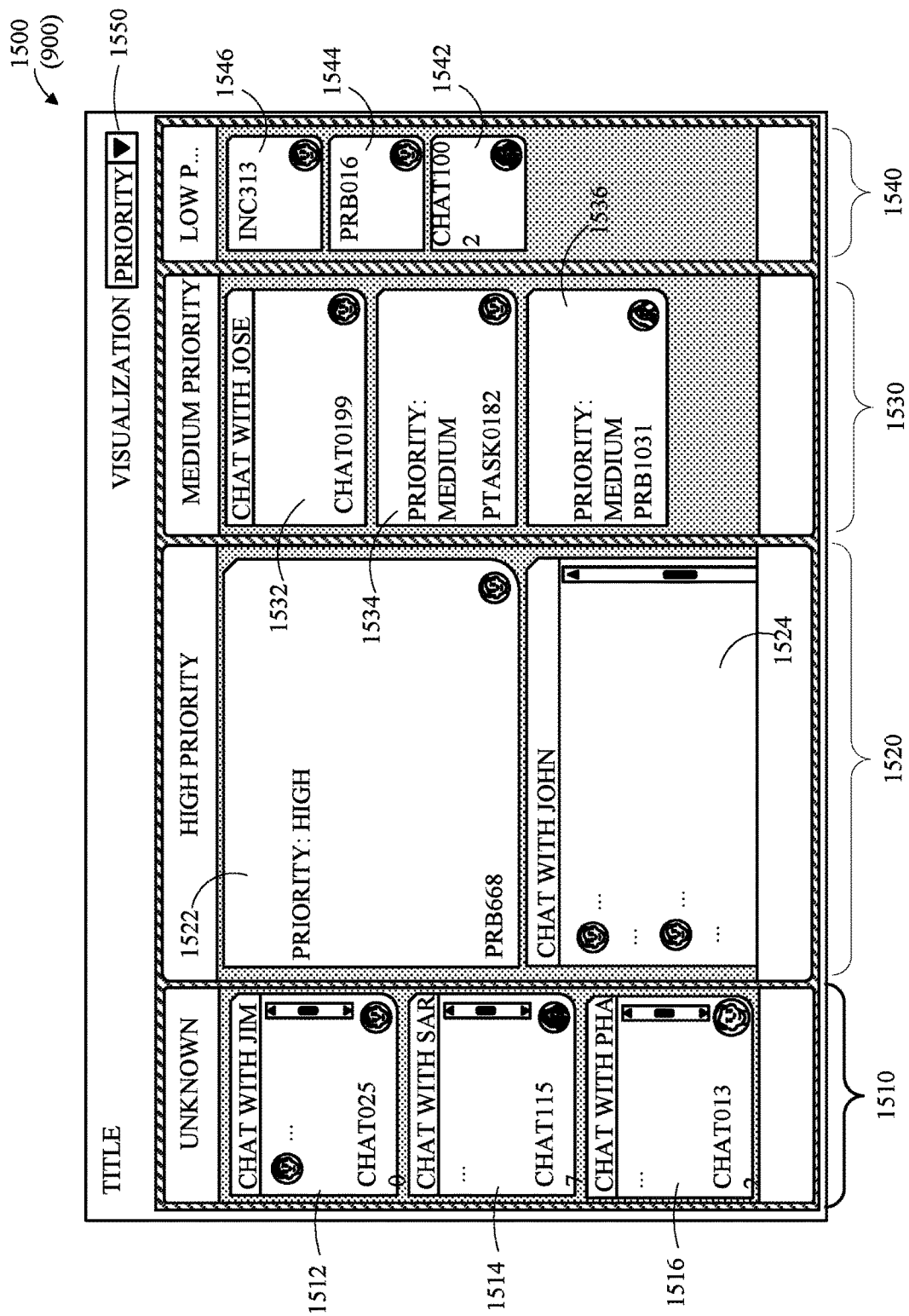
FIG. 15 shows a diagram of an example of a priority visualization of the visual task board of FIG. 14 in accordance with this disclosure.

FIGS. 14-15 are pictorial diagrams of examples of visual task board visualizations as might be utilized in a problem resolution system in accordance with this disclosure. A visual task board may represent the defined information set 300 in accordance with multiple visualizations, perspectives, or views. Each visualization may represent the information set 300 based on a specified criterion, such as status, priority, severity, user, group, task type, labels, or any other element from the information set 300.

For simplicity and clarity the examples shown in FIGS. 14-15 are based on an information set 300 that includes a first problem with the identifier 'PRB1031', a priority of 'Medium', and a status of 'New'; a second problem with the identifier 'PRB668', a priority of 'High', and a status of 'In Progress'; a third problem with the identifier 'PRB016', a priority of 'High', and status of 'Complete'; a first task with the identifier 'PTASK76152', a priority of 'High', and a status of 'New'; a second task with the identifier 'PTASK0182', a priority of 'Medium', and a status of 'On Hold'; a first chat with a user named 'Pham', a chat identifier 'CHAT0132', and a status of 'New'; a second chat with a user named 'John', a chat identifier 'CHAT0173', and a status of 'In Progress'; a third chat with a user named 'Jose', a chat identifier of 'CHAT0199', and a status of 'On Hold'; a fourth chat with a user named 'Chia', a chat identifier of 'CHAT1002', and a status of 'Complete'; a fifth chat with a user named 'Sara', a chat identifier of 'CHAT1157'; a sixth chat with a user named 'Jim', and a chat identifier of 'CHAT0250'; and an incident with the identifier 'INC313', a priority of 'Low', and a status of 'Complete'. The information set 300 does not indicate a priority for the chat with 'Pham', the chat with 'Jim', or the chat with 'Sara'.

FIG. 14 is a pictorial diagram of an example of a status visualization of a visual task board 900 in accordance with this disclosure. The status visualization of the visual task board 900, 1400 includes a first lane 1410 representing a 'New' status. The 'New' lane 1410 includes a first card 1412 that represents the problem with the identifier 'PRB1031', a second card 1414 that represents the task with the identifier 'PTASK76152', and a third card 1416 that represents the chat with the chat identifier 'CHAT0132'. The status visualization of the visual task board 1400 includes a second lane 1420 representing an 'In Progress' status. The 'In Progress' lane 1420 includes a first card 1422 that represents the problem with the identifier 'PRB668', and a second card 1424 that represents the chat with 'John'. The status visualization of the visual task board 1400 includes a third lane 1430 representing an 'On Hold' status. The 'On Hold' lane 1420 includes a first card 1432 that represents the chat that has the chat identifier of 'CHAT0199', and a second card 1434 that represents the task with the identifier 'PTASK0182'. The status visualization of the visual task board 1400 includes a fourth lane 1440 representing a 'Complete' status. The 'Complete' lane 1440 includes a first card 1442 that represents the that has the chat identifier of 'CHAT1002', a second card 1444 that represents the problem with the identifier 'PRB016', and a third card 1446. Cards for the chat with 'Jim' and the chat with 'Sara' are not shown in FIG. 14.

The visual task board may be revisualized to represent the information set 300 based on a different visualization criterion. For example, the visual task board may be revisualized in response to user input selecting a visualization criterion other than 'Status' from the visualization control 1450. In some applications, the visualization may be based on a definite or constrained visualization metric as shown, which may correspond with a guided task board. A constrained visualization metric may be a metric for which a set of available values is defined. Although not expressly shown, in some applications, the visualization may be based on an indefinite or unconstrained visualization metric, which may correspond with a flexible task board. For example, one or more of the records represented by a visual task board may include a description element, which may have any value, and the description element may be selected as the visualization metric for the visual task board. In some applications, a visual task board based on an unconstrained visualization metric may include a defined default set of lanes, such as a new lane, an in progress lane, and a complete lane, which may be customized by a user of the visual task board.

FIG. 15 shows a diagram of an example of a priority visualization of the visual task board 900 in accordance with this disclosure. In the priority visualization, the visual task board 900, 1500 for the information set 300 includes a first lane 1510 representing an 'Unknown' status. Cards that do not include an information element corresponding to the visualization criterion may be included in the 'Unknown' lane 1510. The 'Unknown' lane 1510 includes a first card 1512 that represents the chat that has the chat identifier 'CHAT0250', a second card 1514 that represents the chat that has the chat identifier 'CHAT1157', and a third card 1516 that represents the chat that has the chat identifier 'CHAT0132'. The priority visualization of the visual task board 1500 includes a second lane 1520 representing a high priority. The high priority lane 1520 includes a first card 1522 that represents the problem with the identifier 'PRB668', and a second card 1524 that represents the chat with 'John'. The priority visualization of the visual task board 1500 includes a third lane 1530 representing a medium priority. The medium priority lane 1520 includes a first card 1532 that represents the chat with 'Jose', a second card 1534 that represents the task with the identifier 'PTASK0182', and a third card 1536 that represents the problem with the identifier 'PRB1031'. The priority visualization of the visual task board 1500 includes a fourth lane 1540 representing a low priority. The low priority lane 1540 includes a first card 1542 that represents the chat that has the chat identifier of 'CHAT1002', a second card 1544 that represents the problem with the identifier 'PRB016', and a third card 1546 that represents the incident with the identifier 'INC313'.

A card 810 in a visual task board 900 may be moved from one lane 800 to another. For example, a card may be moved in response to user input dragging the card from one lane and dropping the card in another lane. For example, the card 1512 may be moved from the unknown priority lane 1510 to the high priority lane 1520 and the conversation records represented by the card 1512 may be updated to indicate that the conversation is a high priority conversation. In some applications, the visual task board system may prevent a card from changing priority and the card 1512 may not be dragged and dropped on another lane.

Although not shown in FIG. 15, in some applications, the information included in a card 810 may be based on the visualization metric. For example, the visualization metric may be status, as shown in FIG. 14, the priority information may be included in the cards 810 and the status information may be omitted from the cards, the visualization metric may be changed to priority, and the priority information may be omitted from the cards and the status information may be included in the cards.

Figure 16:
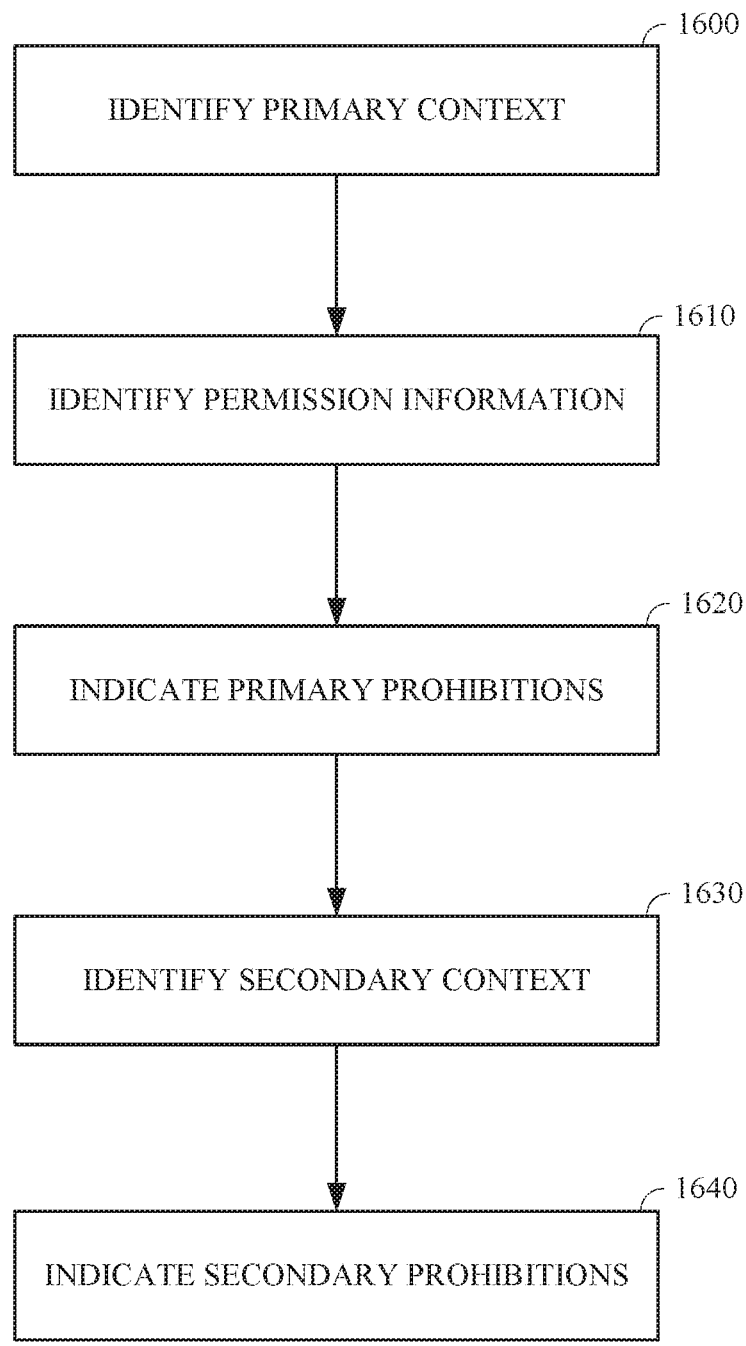
FIG. 16 is a flowchart of an example of a method of generating a visual task board including permitted assignment in accordance with this disclosure.

FIG. 16 is a flowchart of an example of a method of generating a visual task board including permitted assignment in accordance with this disclosure. Generating a visual task board including permitted assignment may be implemented in a computing system, such as the cloud computing system 100 shown in FIG. 1. For example, generating a visual task board including permitted assignment may be implemented on a server, such as one or more of the servers 122 shown in FIG. 1, a computing device, such as a client 112 shown in FIG. 1, or by a combination thereof communicating via a network, such as the network 130 shown in FIG. 1. Generating a visual task board including prohibition indicators may include identifying a primary context at 1600, identifying permission information at 1610, indicating primary prohibitions at 1620, identifying a secondary context at 1630, indicating secondary prohibitions at 1640, or a combination thereof.

A primary context may be identified at 1600. A primary context may be an interface element, such as an avatar, a card, or a lane. A primary context may be identified in response to input, such as user input. For example, the visual task board system may receive information indicating user input selecting and dragging an avatar as the primary context, as shown in FIGS. 10-13.

Permission information may be identified at 1610. Identifying the permission information may include reading or parsing the permission information based on the primary context identified at 1600. For example, the visual task board system may include information, such as privilege or permission information, for one or more records indicating actions that may be performed for the records, such as assignment or association with another record, based one or more information elements included in the records. For example, the permission information may indicate whether a member may be assigned to or associated with records that include the Approval Queue status information element, and the visual task board system may prohibit members from being assigned to or associated with records that include the Approval Queue status information element based on the permission information.

Identifying the permission information may include identifying one or more candidate actions based on the primary context identified at 1600. For example, the primary context may be identified as an avatar representing a member, as shown in FIG. 11, and the candidate actions may include an "assign to record" candidate action. Identifying the permission information may include identifying one or more candidate secondary contexts based on the primary context identified and the candidate actions identified. For example, the candidate secondary contexts may include each of the cards included in the visual task board, as shown in FIG. 11.

Primary prohibitions may be indicated at 1620. In some embodiments, a primary prohibition indicator may be included in one or more of the candidate secondary contexts based on the permission information identified at 1610. A primary prohibition indicator may include visual element, such as a background color, of a representation of a record in the visual task boards, such as a lane, a card, or an avatar. For example, the background color of a card for a permitted assignment may be white and the background color of a card for a prohibited assignment may be gray, as shown in FIGS. 11-12.

A secondary context may be identified at 1630. A secondary context may be an interface element, such as an avatar, a card, or a lane. A secondary context may be identified in response to input, such as user input. For example, the visual task board system may receive information indicating user input selecting and dragging an avatar as the primary context, and may dropping the avatar on a card, selecting the card as the secondary context, as shown in FIG. 12.

In some implementations, identifying permission information at 1610 may include identifying secondary prohibition candidates based on the primary context identified at 1600 and the candidate secondary contexts. In some implementations, the secondary prohibition candidates may be identified based on the primary context identified at 1600, the permission information identified at 1610, and the secondary context identified at 1630. A secondary prohibition candidate may be a record for which the permission information indicates that the prohibited action identified based on the primary context and a candidate secondary context applies. For example, the visual task board may include a first avatar representing a first member and a second avatar representing a second member, the primary context identified at 1600 may be the first avatar, the permission information identified at 1610 may indicate a prohibition against assigning the first member and the second member to a first candidate secondary context, and the secondary prohibition candidate may be identified as the second avatar.

Secondary prohibitions may be indicated at 1640. In some embodiments, a secondary prohibition indicator may be included in one or more of the secondary prohibition candidates based on the permission information identified at 1610 and the secondary context identified at 1630. A secondary prohibition indicator may include a visual element of a representation of a record in the visual task boards. For example, a red X may be shown overlapping avatars to indicate that assignment of the members represented by the avatars to the record represented by the card identified as the secondary context is prohibited, as shown in FIGS. 12-13.

Although not expressly shown in FIGS. 11-13, a record represented by a card, such as a task record, a problem record, or a conversation record, may be assigned a status using the visual task board. In some embodiments, a record may be assigned a status in response to input, such as user input dragging the card representing the task to a target lane. For example, a card, such as the card 1010 shown in FIG. 10 may be moved from a first or source, lane, such as the In Progress lane 1004 shown in FIG. 10, to a second or target, lane, such as the Approval Queue lane 1006 shown in FIG. 10, and the task records represented by the card may be updated to indicate a change of the status of the task to correspond with the target lane.

In some implementations, the assignment of a task to a lane may be prohibited based on the permission information. For example, a member, such as the fourth member represented by the fourth avatar 1036 shown in FIG. 10, may be associated with a task represented by a card, such as the card 1010 shown in FIG. 10. The permission information may indicate a prohibition against assigning the member to a task that has the Approval Queue status. The visual task board system may receive input, such as user input, dragging the card representing the task to a target lane that corresponds to the Approval Queue status, and the visual task board may indicate that the assignment is prohibited. For example, the visual task board may present a dialog, such as a message box, or any other sensory indicator, such as a haptic indicator or an audible indicator, or combination of indicators, indicating that the assignment is prohibited.

In some embodiments, the prohibition indicator may identify a reason for the prohibition, a solution to obviate the prohibition, or both. For example, the prohibition indicator may indicate that an assignment is prohibited for the reason that a member assigned to the current task does not have permission to be assigned to a task that has the status associated with the target lane. In another example, the prohibition indicator may indicate that that prohibition may be obviated, and the assignment may be allowed, by removing the association between prohibited member and the task, which may include assigning another member to the task. In some embodiments, the prohibition indicator may include a listing of members that have permission to be assigned to a task that has the status corresponding to the target lane. For example, a first member, such as the fourth member represented by the fourth avatar 1036 shown in FIG. 10, may be associated with a task represented by a card, such as the card 1010 shown in FIG. 10. The permission information may indicate a prohibition against assigning the first member to a task that has the Approval Queue status. The permission information may indicate that a second member has permission to be assigned to a task that has the Approval Queue status. The visual task board system may receive input, such as user input, dragging the card representing the task to a target lane that corresponds to the Approval Queue status, and the visual task board may indicate that the assignment is prohibited. The prohibition indication may indicate that the first member is prohibited from being assigned to the Approval Queue lane, and may suggest replacing the first member with the second member. The assignment may be performed in response to input, such as user input, selecting an allowed member.

All or a portion of implementations of the invention described herein can be implemented using a general purpose computer/processor with a computer program that, when executed, carries out any of the respective techniques, algorithms and/or instructions described herein. In addition, or alternatively, for example, a special purpose computer/ processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The embodiments herein may be described in terms of functional block components and various processing steps. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional implementations may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any implementation or design described herein as "example" is not necessarily to be construed as preferred or advantageous over other implementations or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional implementations of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "including," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for overlaying an indicator in a window region of a graphical user interface representing groupings of related records, comprising:
   a processor configured to execute instructions stored in a memory, the instructions comprising:
      an information set identifier module that identifies a visual task board information set structured in the memory that comprises a plurality of records, wherein each record comprises at least one information element from a plurality of information elements from the visual task board information set;
      an information element identifier module that identifies an information element of the plurality of records as a visualization metric for output on a display of the graphical user interface;
      a lane generator module that generates a plurality of lane display regions of a graphical user interface window structured as lanes based on the visualization metric, wherein each lane from the plurality of lanes is associated with a respective value of the visualization metric;
      a card generator module that generates a card display region of the graphical user interface windows, structured as a first card representing a first record from the plurality of records, wherein the first record comprises an information element that has a first value of the visualization metric;
      an output generation module that generates an output for display in the graphical user interface window, the output comprising
         a first lane display region from the plurality of lane display regions, the first lane display region representing the first value of the visualization metric and comprising:
            an indication of the first value of the visualization metric,
            a first card display region that overlaps the first lane display region for display of the first card, wherein the first card is sized based on a size of the first lane display region and containing a subset of the information elements, wherein each of the subset of information elements includes a display rank indicating a priority for including an associated information element in the first card and wherein the subset of information elements is selected by identifying at least one information element using a respective display rank and by determining whether space is available in the first card to include the at least one information element using—the size of the first card,
         a system card that overlaps the first lane display region, the system card not being representative of any of the plurality of records and being representative of the lane, and
         an activity stream that displays a history of changes for the first card; and
      an output module that transmits via a graphical user interface output interface or stores in the memory the output;
   wherein:
      the output generation module, in response to operator input provided to a communication input of the processor indicating a primary context and on a condition that an association between the primary context and the first record is prohibited, is configured to update the output utilizing:
         the card generation module to generate an updated first card display region representing the first record, the updated first card display region comprising an indicator overlay that indicates the association in the memory between the first record and the primary context is prohibited;

the lane generator module to generate an updated output for display that comprises an updated first lane display region representing the first value of the visualization metric, the updated first lane display region replacing the first card display region with the updated first card display region; and the output module to transmit via the graphical user interface output interface or stores in the memory the updated output.

2. The apparatus of claim 1, wherein the instructions further comprise:

an avatar output generation module that generates the output such that the output comprises a plurality of avatars, wherein each avatar from the plurality of avatars represents a respective user from a plurality of users for the visual task board information set; and a user identification module that identifies a first user from the plurality of users as the primary context in response to the operator input, wherein the operator input comprises dragging on a display device a first avatar from the plurality of avatars, wherein the first avatar represents the first user.

3. The apparatus of claim 2, wherein the output generation module is configured such that:

on a condition that the operator input comprises dragging the first avatar to the first card display region or the updated first card display region, generates a plurality of updated avatars, wherein each updated avatar from the plurality of updated avatars represents a respective user from the plurality of users for the visual task board information set; and on a condition that an association between the first record and the respective user is prohibited, the avatar representing the respective user is overlaid with a prohibition indicator that indicates that the association between the first record and a respective user is prohibited.

4. The apparatus of claim 1, wherein:

the card generation module generates a second card display region representing a second record from the plurality of records, wherein the second record comprises an information element that has the first value of the visualization metric, the lane generation module generates the output such that the first lane display region comprises the second card display region, and the output generation module is configured to:
generate an updated second card display region representing the second record, the updated second card display region comprising an indicator that indicates the association between the second record and the primary context is prohibited; and generate the updated output such that the updated first lane display region replacing the second card display region with the updated second card display region.

5. The apparatus of claim 1, wherein:

the card generator module generates the first card display region such that the first card display region comprises a background having a first background color; and the card generator module updates the updated first card display region such that the updated first card display region comprises a background having a second background color that differs from the first background color.

6. The apparatus of claim 1, wherein the instructions further comprise:

an association prohibition determination module that determines whether the association between the first record and the primary context is prohibited by:

identifying a plurality of permission records for the visual task board information set; and determining that a permission record from the plurality of permission records indicates that an association between the user corresponding to the primary context and records having the first value of the visualization metric is prohibited.

7. The apparatus of claim 1, wherein the instructions further comprise:

an association prohibition determination module that determines whether the association between the first record and the primary context is prohibited by:

identifying a plurality of permission records for the visual task board information set; and determining that the plurality of permission records omits a permission record that indicates that an association between a user corresponding to the primary context and records having the first value of the visualization metric is allowed.

8. The apparatus of claim 1, wherein the output generation module is configured to:

identify the first card display region as the primary context in response to the operator input, wherein the operator input comprises dragging on the display the first card display region from the first lane display region to a second lane display region representing a second value of the visualization metric; and on a condition that an association between a user associated with the first card display region and the second value of the visualization metric is prohibited, generate a message for the graphical user interface display indicating that assigning the first card display region to the second lane display region is prohibited.

9. The apparatus of claim 8, wherein the output generation module is further configured to update the output by:

generating the message such that the message indicates that assigning the first card display region to the second lane display region is prohibited because assigning the user associated with the first card display region to the second lane display region is prohibited, and indicating a second user for which an association with the second lane display region is permitted.

10. An apparatus for overlaying an indicator in a window region of a graphical user interface, comprising:

a processor configured to execute instructions stored in a memory to:

identify a visual task board information set that comprises a plurality of records, wherein each record comprises information elements;

identify an information element of the plurality of records as a visualization metric;

generate a plurality of lanes based on the visualization metric, wherein each lane from the plurality of lanes is associated with a respective value of the visualization metric;

generate a plurality of cards, wherein each card from the plurality of cards represents a respective record from the plurality of records, and wherein each respective record comprises a respective information element that has a respective value of the visualization metric;

generate an output for display, the output comprising each lane from the plurality of lanes, such that each lane from the plurality of lanes represents a respective value of the visualization metric and comprises cards from the plurality of cards that represent records that comprise a subset of information elements that have the respective value of the visualization metric, wherein the information elements associated with the subset of information elements include a display rank indicating a priority for including respective information elements in a respective card and wherein the subset of information elements is selected by identifying at least one information element using a respective display rank and by determining whether space is available in a respective card to include the at least one information element using the size of the respective card; and an indication of the respective value of the visualization metric;

transmit or store the output; and in response to operator input indicating a primary context, update the output by:

generating a plurality of updated cards, wherein each updated card from the plurality of updated cards represents a respective record from the plurality of records, wherein each respective record comprises a respective information element that has a respective value for which an association with the primary context is prohibited;

generating an updated output for display, the updated output comprising each updated lane from a plurality of updated lanes, such that each updated lane from the plurality of updated lanes represents a respective value of the visualization metric, wherein each updated lane from the plurality of updated lanes omits cards from the plurality of cards that represent records that comprise information elements that have values for which an association with the primary context is prohibited, and comprises updated cards from the plurality of updated cards; and transmitting or storing the updated output.

11. The apparatus of claim 10, wherein the processor is configured to execute instructions stored in the memory to:

generate the output such that the output comprises a plurality of avatars, wherein each avatar from the plurality of avatars represents a respective user from a plurality of users for the visual task board information set; and identify a first user from the plurality of users as the primary context in response to the operator input, wherein the operator input comprises dragging a first avatar from the plurality of avatars, wherein the first avatar represents the first user.

12. The apparatus of claim 11, wherein the processor is configured to execute instructions stored in the memory to:

on a condition that the operator input comprises dragging the first avatar to a first card from the plurality of cards or a first updated card from the plurality of updated cards, generate a plurality of updated avatars, wherein each updated avatar from the plurality of updated avatars represents a respective user from the plurality of users for the visual task board information set, and, on a condition that an association between the respective user and the first card is prohibited, the updated avatar representing the respective user indicates that the association between the respective user and the first card is prohibited.

13. The apparatus of claim 10, wherein the processor is configured to execute instructions stored in the memory to:

generate the plurality of cards such that each card from the plurality of cards comprises a respective background having a first background color, and generate the plurality of updated cards such that, each updated card from the plurality of updated cards comprises a respective background having a second background color that differs from the first background color.

14. The apparatus of claim 10, wherein the processor is configured to execute instructions stored in the memory to determine whether a respective record comprises a value of an information element for which an association with the primary context is prohibited by:

identifying a plurality of permission records for the visual task board information set; and determining that a permission record from the plurality of permission records indicates that an association between a user corresponding to the primary context and the value of the information element is prohibited.

15. The apparatus of claim 10, wherein the processor is configured to execute instructions stored in the memory to determine whether a respective record comprises a value of an information element for which an association with the primary context is prohibited by:

identifying a plurality of permission records for the visual task board information set; and determining that the plurality of permission records omits a permission record that indicates that an association between a user corresponding to the primary context and the value of the information element is allowed.

16. The apparatus of claim 10, wherein the processor is configured to execute instructions stored in the memory to update the output by:

identifying a first card from the plurality of cards as the primary context in response to the operator input, wherein the operator input comprises dragging the first card from a first lane from the plurality of lanes to a second lane from the plurality of lanes, the first lane representing a first value of the visualization metric and the second lane representing a second value of the visualization metric; and on a condition that an association between a user associated with the first card and the second value of the visualization metric is prohibited, generating a message indicating that assigning the first user to the second lane is prohibited, and indicates a second user for which an association with the second value of the visualization metric is permitted.

17. A computer-implemented method for overlaying an indicator in a window region of a graphical user interface, comprising:

identifying, using a processor, a visual task board information set structured in a memory for display on a display device that comprises a plurality of records, wherein each record comprises information elements, and an information element for output on a display of the graphical user interface;

creating a plurality of lanes within the visual task board information set memory with each lane being related to an information element;

creating a first card for inclusion in a first lane of the plurality of lanes that comprises data from a first record of the information element, wherein the first card is sized based on a size of the first lane and contains a subset of the information elements, wherein each of the subset of information elements includes a display rank indicating a priority for including an associated information element in the first card and wherein the subset of information elements is selected by identifying at least one information element by using a respective display rank and by determining whether space is available in the first card to include the at least one information element using the size of the first card;

generating graphical output based on the first card and plurality of lanes;

transmitting over a graphical user interface output interface or storing in the memory the graphical output;

identifying a first user from a plurality of users as a primary context in response to an operator input interacting with a first avatar from a plurality of avatars, wherein each respective avatar of the plurality of avatars represents a respective user of the plurality of users, and wherein the first avatar represents the first user; and on a condition that an association between the first record and the first user is prohibited, updating the graphical output by:

updating the first card indicating that the association between the first record and the first user is prohibited, and updating the first lane representing a first value of the visualization metric, the updated first lane replacing the first card and with the updated first card; and transmitting the updated output over the graphical user interface output interface or storing the updated output in the memory.

18. The method of claim 17, further comprising:

on a condition that the operator input comprises dragging the first avatar to the first card or the updated first card, generating the updated output by:

generating a plurality of updated avatars, wherein each updated avatar from the plurality of updated avatars represents a respective user from the plurality of users for the visual task board information set; and on a condition that an association between the first record and the respective user is prohibited, the updated avatar representing the respective user indicates that the association between the first record and a respective user is prohibited; and generating the updated output such that the updated output contains no avatars from the first plurality of avatars that represent respective users from the plurality of users for which an association with the first record is prohibited, and comprises the updated avatars from the plurality of updated avatars.

19. The method of claim 17, further comprising:

generating the first card such that the first card comprises a background having a first background color; and generating the updated first card such that the updated first card comprises a background having a second background color that differs from the first background color.

20. The method of claim 17, further comprising:

determining whether the association between the first record and the first user is prohibited by:

identifying a plurality of permission records for the visual task board information set; and determining that a permission record from the plurality of permission records indicates that the association between the first record and the first user is prohibited or determining that the plurality of permission records omits a permission record that indicates that an association between the first record and the first user is allowed.

* * * * *